(12) United States Patent
Lee

(10) Patent No.: US 6,401,564 B1
(45) Date of Patent: Jun. 11, 2002

(54) SHIFT SWITCH CONTROL DEVICE FOR SELECTION LEVER UNITS OF AUTOMATIC TRANSMISSIONS

(75) Inventor: Sang-Joo Lee, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/739,810

(22) Filed: Dec. 20, 2000

(30) Foreign Application Priority Data

Sep. 4, 2000 (KR) ........................................ 2000-52012

(51) Int. Cl.[7] .............................................. F16H 59/02
(52) U.S. Cl. ...................... 74/473.18; 74/96; 74/473.12; 200/61.88
(58) Field of Search ................ 74/96, 473.18, 74/473.12; 200/61.88

(56) References Cited

U.S. PATENT DOCUMENTS 5,197,344 A * 3/1993 Maier et al. ............. 200/61.88
5,682,789 A * 11/1997 DeCrouppe et al. .......... 74/335

* cited by examiner

Primary Examiner—Allan D. Herrmann
(74) Attorney, Agent, or Firm—Birch, Stewart, Kolasch & Birch, LLP

(57) ABSTRACT

A shift switch control device for selection lever units of automatic transmissions is disclosed. The shift switch control device has a selection lever for selecting a desired range within a transmission pattern during the automatic transmission mode and performing an up- or down-shifting operation during the manual transmission mode. A rotary plate is provided at the selection lever, and has up- and down-shift switches at its top end, with a projection provided at the central portion of the rotary plate. A manipulation lever is installed at the top of the selection lever at a position between the up- and down-shift switches, and turns on or off the up- or down-shift switch. A projection guide plate, having an inclined surface at one end thereof, is provided on the selection lever. The control device also has a rotary plate return means for giving an elastic returning force to the rotary plate. In this control device, the actuated direction of the actuation buttons of the two shift switches is equal to that of the manipulation lever, thus accomplishing a desired operational reliability of the control device during a manual transmission mode. The control device is also reduced in the number of its parts, thus being preferably simplified in its construction and being easily manufactured at a low production cost, and being easily installed within a limited area.

7 Claims, 7 Drawing Sheets

SHIFT SWITCH CONTROL DEVICE FOR SELECTION LEVER UNITS OF AUTOMATIC TRANSMISSIONS

BACKGROUND OF THE INVENTION

1. Field of the Invention

The present invention relates to a shift switch control device for selection lever units of automatic transmissions and, more particularly, to a shift switch control device for selection lever units of sport mode-type automatic transmissions capable of selectively performing an automatic transmission mode or a manual transmission mode as desired, the shift switch control device designed to accomplish a reliable up-shift operation, so-called a "+" shift operation, and a reliable down-shift operation, so-called a "−" shift operation, during a manual transmission mode, and to be reduced in the number of its parts, thus being preferably simplified in its construction.

2. Description of the Prior Art

In recent years, sport mode-type automatic transmissions, designed to allow drivers to select an automatic transmission mode or a manual transmission mode as desired in accordance with driving conditions and/or driver's tastes while driving, have been developed and proposed to be equipped within, particularly, a variety of expensive luxury cars.

Different from conventional transmissions with a fixed automatic transmission mode or a fixed manual transmission mode, such sport mode-type automatic transmissions allow drivers to enjoy the driving feeling to the full while selecting the automatic transmission mode or the manual transmission mode as desired in accordance with driving conditions and/or their tastes while driving their cars.

Such a sport mode-type automatic transmission is provided with a selection lever unit for allowing a driver to perform a desired shifting operation. The construction of a conventional selection lever unit for such sport mode-type automatic transmissions is shown in FIGS. 7, 8 and 9. As shown in the drawings, the conventional selection lever unit has a selection lever 100, which is installed within a main frame 111 and is used for selecting a desired mode or a desired range within a transmission pattern 110 having a manual transmission mode and an automatic transmission mode. A cable bracket 113 is connected to a shift cable (not shown) at a position around the selection lever 100. The above cable bracket 113 is operated in conjunction with the selection lever 100 when the automatic transmission mode is selected, thus actuating a transmission manual valve (not shown).

The selection lever 100 has two connection protrusions 114, while the cable bracket 113 has a connection lever 115 at a position corresponding to the connection protrusions 114. Therefore, the selection lever 100 is operated in conjunction with the cable bracket 113 through the engagement of the two connection protrusions 114 and 114' with the connection lever 115 during an automatic transmission mode.

The conventional selection lever unit has a shift switch control device of FIG. 9. As shown in the drawing, the conventional shift switch control device for selection lever units comprises a manual mode select switch 103, an up-shift switch 101, a down-shift switch 102 and a switch actuation unit, which are provided on the top wall of the main frame 111. The up-shift switch 101 and the down-shift switch 102 are used for performing the up- and down-shifting operations when the manual transmission mode is selected by the selection lever 100.

In such a case, the up-shift switch 101 is positioned at the front portion of the shift switch control device, while the down-shift switch 102 is positioned at the rear portion of the control device. In addition, the manual mode select switch 103 is positioned between the up-shift switch 101 and the down-shift switch 102.

Two shift switch actuation members 104 and 105 are provided at positions corresponding to the up-shift switch 101 and the down-shift switch 102, with a gap defined between the two shift switch actuation members 104 and 105. When the manual transmission mode is selected by the selection lever 100, the lever 100 is inserted into the gap defined between the two shift switch actuation members 104 and 105 while pushing and turning on the manual mode select switch 103.

In each of the two shift switch actuation members 104 and 105, a tipping bar 108 is set within a housing 106 while being normally biased by a return spring 107 at its rear end, thus normally positioning the selection lever 100 at a neutral position.

Therefore, when the selection lever 100 is moved to perform a desired shifting operation, the tipping bars 108 of the two shift switch actuation members 104 and 105 actuate the up and down-shift switches 101 and 102, thus allowing the switches 101 and 102 to output up- and down-shifting signals.

In such a case, the manual mode select switch 103 is continuously operated by a side surface of the selection lever 100, thus being maintained at its activated state.

However, such a conventional shift switch control device for selection lever units of automatic transmissions is problematic in that it is very difficult to maintain the precise actuation gaps between the tipping bars 108 and the up- and down-shift switches 101 and 102. In addition, the operational direction of the tipping bars 108 is different from the operational direction of the up- and down-shift switches 101 and 102. Therefore, the shift switch control device may fail to accomplish a desired operational reliability.

In addition, it is very difficult to manufacture the tipping bars, and so the tipping bars are very expensive. Another problem experienced in the conventional shift switch control device resides in that it has a complex construction and is not easy to install within a limited area.

SUMMARY OF THE INVENTION

Accordingly, the present invention has been made keeping in mind the above problems occurring in the prior art, and an object of the present invention is to provide a shift switch control device for selection lever units of automatic transmissions capable of selectively performing an automatic transmission mode or a manual transmission mode as desired, which is designed to accomplish a reliable up-shift operation, so-called a "+" shift operation, and a reliable down-shift operation, so-called a "−" shift operation, during a manual transmission mode, and which is reduced in the number of its parts, thus being preferably simplified in its construction.

In order to accomplish the above object, the present invention provides a shift switch control device for selection lever units of automatic transmissions, comprising: a selection lever installed within a main frame of a chassis by a hinge shaft and used for selecting a desired range within a transmission pattern during an automatic transmission mode and performing an up- or down-shifting operation during a manual transmission mode, the transmission pattern having an automatic transmission mode pattern and a manual transmission mode pattern, the selection lever turning on or off up- and down-shift switches during the manual transmission mode, thus performing the up- or down-shifting operation; a rotary plate mounted to the hinge shaft at one side of the selection lever, with the up- and down-shift switches provided at the top end of the rotary plate while being spaced apart from each other at a predetermined gap, and a projection provided at the central portion of the rotary plate while extending toward the selection lever; a manipulation lever installed at the top portion of the selection lever such that the manipulation lever is positioned between the up- and down-shift switches at a M-stage of the manual transmission mode pattern, the manipulation lever being used for turning on or off the up- or down-shift switch; a projection guide plate provided on the selection lever at a position corresponding to the projection of the rotary plate under the manipulation lever, with an inclined surface formed at one end of the projection guide plate to prevent the up-shift switch from coming into undesired contact with the manipulation lever when the selection lever is moved from a D-stage to the M-stage, thus allowing the projection to push the rotary plate outward so as to position the manipulation lever in the gap between the up- and down-shift switches; and a rotary plate return means for giving an elastic returning force to the rotary plate, the rotary plate return means being mounted to the hinge shaft of the rotary plate at the outside of the rotary plate.

In the above shift switch control device, the M-stage of the manual transmission mode pattern has a plus (+) stage for actuating the up-shift switch and a minus (−) stage for actuating the down-shift switch.

In the preferred embodiment, the manipulation lever comprises: a horizontal part having a predetermined length so as to be free from coming into undesired contact with the up-shift switch when the selection lever is moved from the D-stage to the M-stage; and a vertical part extending from the tip of the horizontal part downward to a predetermined length so as to selectively come into contact with the up- and down-shift switches, thus turning on or off the up- and down-shift switches.

The projection guide plate comprises: the inclined surface formed at the end of the projection guide plate, the inclined surface being operated in conjunction with the projection of the rotary plate when the selection lever is moved from the D-stage to the M-stage, thus preventing the up-shift switch from coming into undesired contact with the manipulation lever; and a flat guide surface linearly guiding a movement of the projection when the selection lever at the M-stage performs an up- or down-shifting operation.

On the other hand, the return means comprises: a support bracket mounted to the hinge shaft of the rotary plate at the outside of the rotary plate; and a return spring positioned between the rotary plate and the support bracket.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
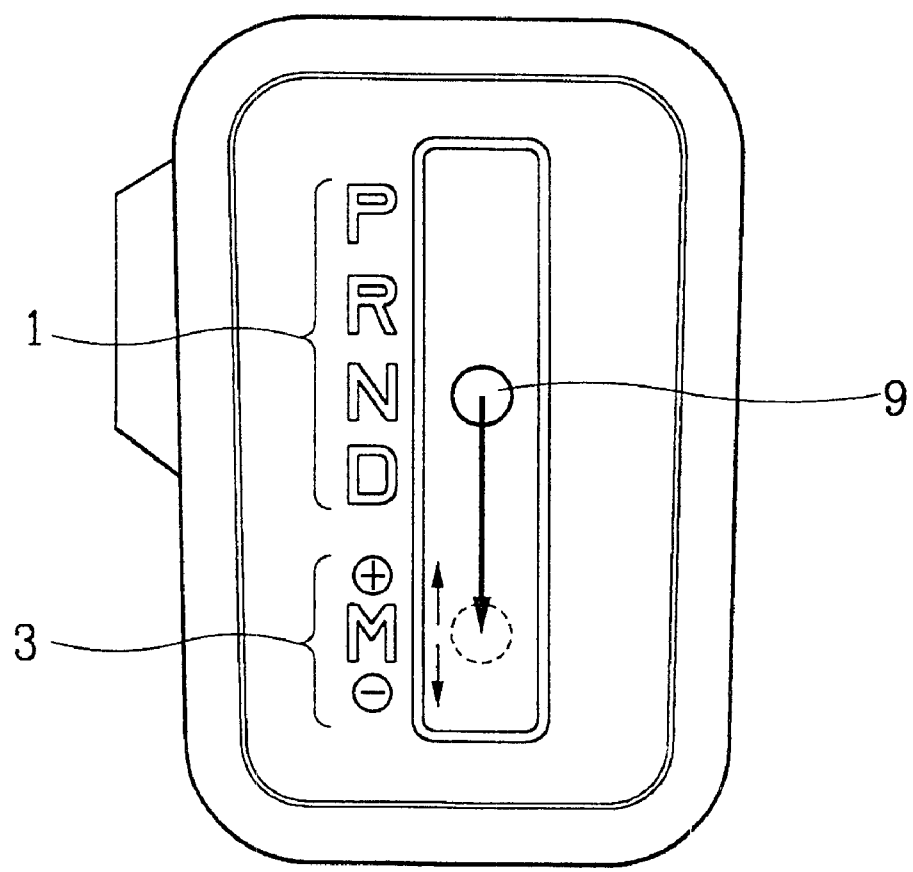
FIG. 1 is a view, showing the transmission pattern of a selection lever unit of automatic transmissions capable of selectively performing an automatic transmission mode or a manual transmission mode as desired in accordance with the preferred embodiment of the present invention.
Figure 2:
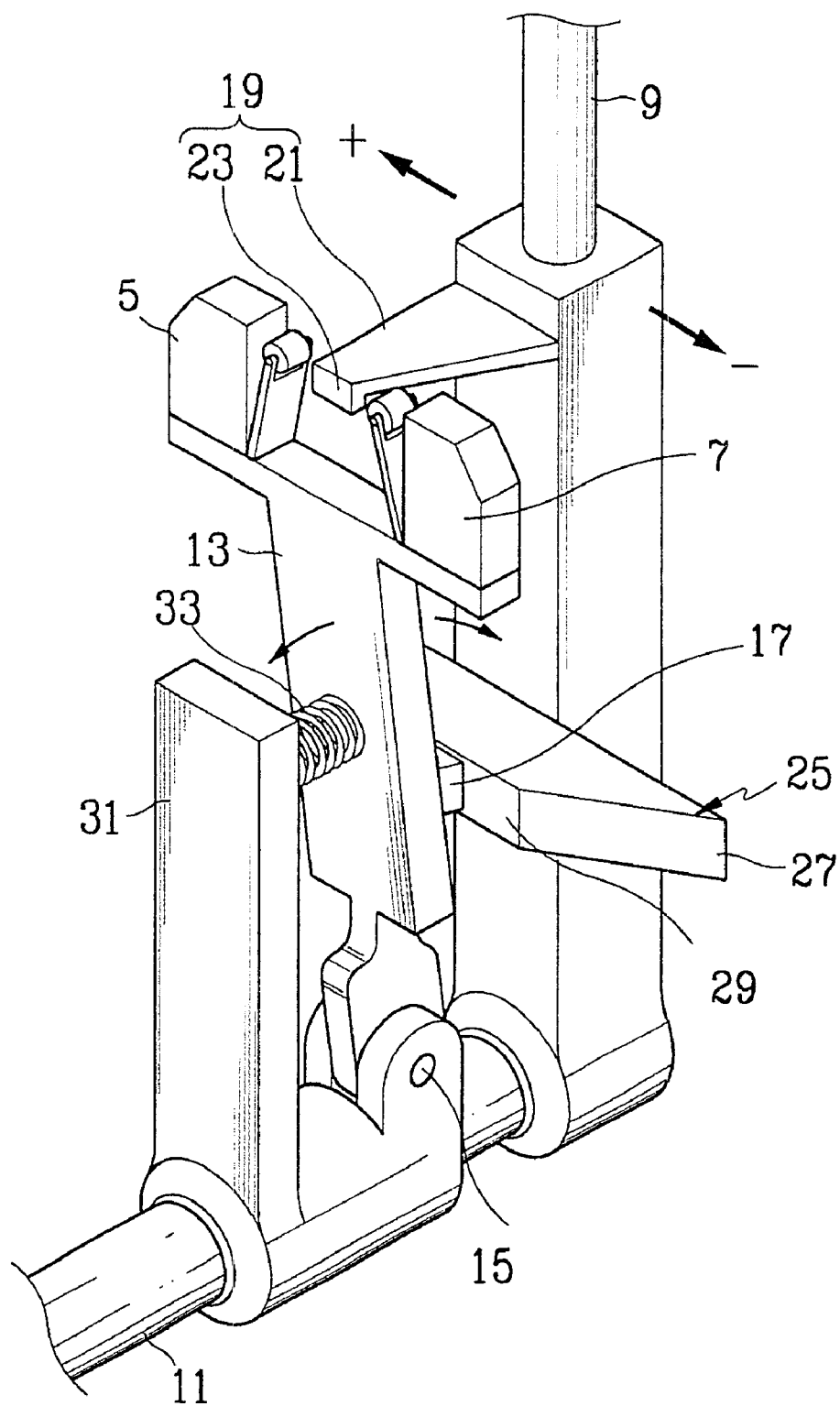
FIG. 2 is a perspective view of a shift switch control device for selection lever units of automatic transmissions in accordance with the present invention.

FIG. 1 is a view, showing the transmission pattern of a selection lever unit of automatic transmissions capable of selectively performing an automatic transmission mode or a manual transmission mode as desired in accordance with the preferred embodiment of the present invention. FIG. 2 is a perspective view of a shift switch control device for selection lever units of automatic transmissions in accordance with the present invention. As shown in the drawings, the transmission pattern of a selection lever unit of automatic transmissions of this invention has an automatic transmission mode pattern 1 comprising a plurality of stages, that is, P, R, N and D-stages arranged in a line, and a manual transmission mode pattern 3 comprising an M-stage. The manual transmission mode pattern 3 is arranged in back of the automatic transmission mode pattern 1.

The M-stage of the manual transmission mode pattern 3 has a plus (+) stage for actuating an up-shift switch 5 and a minus (−) stage for actuating a down-shift switch 7.

As shown in FIG. 2, the shift switch control device for selection lever units of automatic transmissions in accordance with the present invention has a selection lever 9, which is mounted to a hinge shaft 11 so as to be moved between the automatic transmission mode pattern 1 and the manual transmission mode pattern 3 in accordance with a selected transmission mode. The above selection lever 9 turns on or off the up- or down-shift switches 5 or 7 during the manual transmission mode, thus performing the up- or down-shifting operation.

A rotary plate 13 is mounted to the hinge shaft 11 at one side of the selection lever 9. The up- and down-shift switches 5 and 7 are positioned at the top of the selection lever 9 while being spaced apart from each other by a predetermined gap.

A projection 17 is formed at one side of the central portion of the rotary plate 13 while being directed to the selection lever 9.

A manipulation lever 19 is installed at the top of the selection lever 9 such that the manipulation lever 19 is positioned between the up- and down-shift switches 5 and 7 at the M-stage of the manual transmission mode pattern 3.

The manipulation lever 19 thus turns on or off the up- or down-shift switch 5 or 7 in accordance with an up- or down-shifting operation of the selection lever 9.

The above manipulation lever 19 comprises a horizontal part 21 and a vertical part 23. The horizontal part 21 has a predetermined length such that the part 21 does not come into undesired contact with the up-shift switch 5 when the selection lever 9 is moved from the D-stage to the M-stage. The vertical part 23 extends from the tip of the horizontal part 21 downward to a predetermined length so as to selectively come into contact with the up- and down-shift switches 5 and 7, thus turning on or off the up- and down-shift switches 5 and 7.

A projection guide plate 25 is provided on the selection lever 9 at a position corresponding to the projection 17 of the rotary plate 13 under the manipulation lever 19. An inclined surface 27 is formed at one end of the projection guide plate 25. This inclined surface 27 prevents the up-shift switch 5 from coming into undesired contact with the manipulation lever 19 when the selection lever 9 is moved from the D-stage to the M-stage. In such a case, the projection 17 pushes the rotary plate 13 outward, thus allowing the manipulation lever 19 to be positioned in the gap between the up- and down-shift switches 5 and 7.

The projection guide plate 25 also has flat guide surface 29, which linearly guides a movement of the projection 17 when the selection lever 9 at the M-stage performs an up- or down-shifting operation.

In order to give an elastic returning force to the rotary plate 13 when the selection lever 9 is moved from the M-stage to the D-stage, a return means is provided. In the preferred embodiment, this return means comprises a support bracket 31 mounted to the hinge shaft 11 at the outside of the rotary plate 13, with a return spring 33 positioned between the rotary plate 13 and the support bracket 31.

The operation of the above shift switch control device of this invention will be described herein below with reference to FIGS. 3, 4, 5 and 6.

Figure 3:
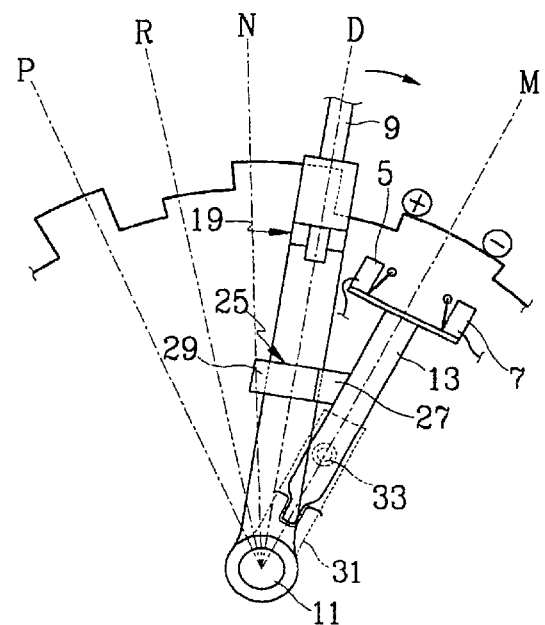
FIG. 3 is a view, showing an operation of the shift switch control device for selection lever units of automatic transmissions of this invention during the automatic transmission mode (D-stage)
Figure 4:
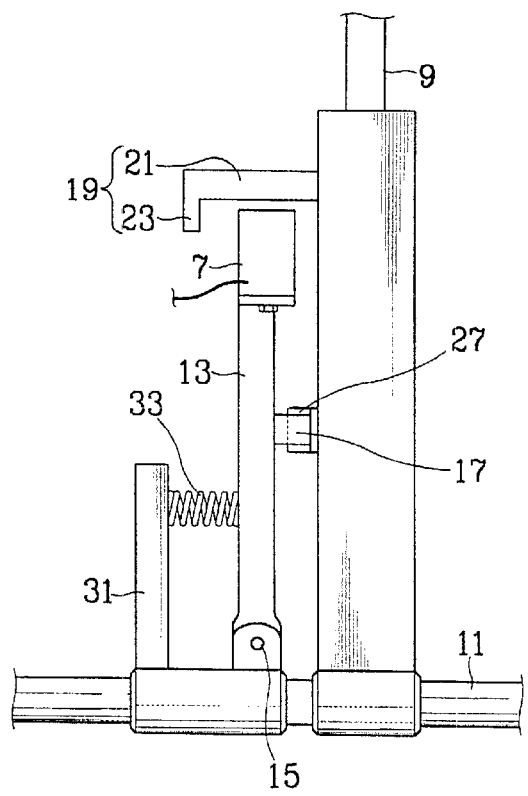
FIG. 4 is a side view of the shift switch control device of FIG. 3.

In FIG. 3, the selection lever 9 is positioned at the D-stage of the automatic transmission mode pattern 1, while the rotary plate 13 is positioned at the M-stage of the manual transmission mode pattern 3. In addition, the projection 17 of the rotary plate 13 is positioned on the inclined surface 27 of the projection guide plate 25 of the selection lever 9 as shown in FIG. 4.

In such a case, the up- and down-shift switches 5 and 7 are positioned inside the vertical part 23 of the manipulation lever 19 relative to the rotating direction of the selection lever 9. In addition, the rotary plate 13 is elastically supported by the return spring 33.

Figure 5:
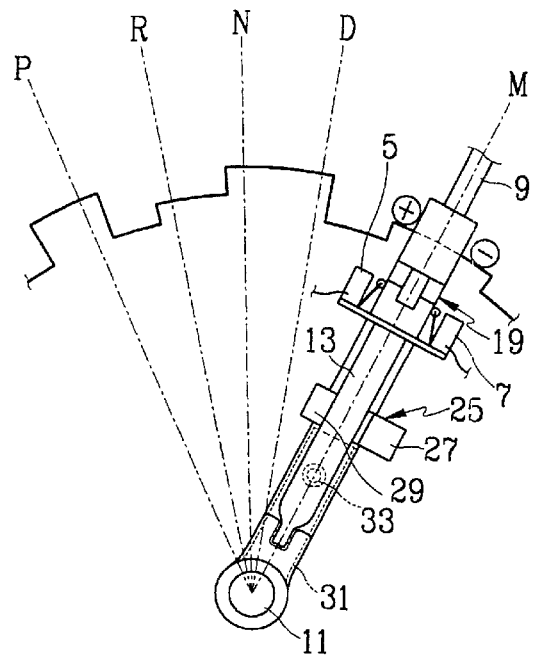
FIG. 5 is a view, showing an operation of the shift switch control device for selection lever units of automatic transmissions of this invention during the manual transmission mode (M-stage)
Figure 6:
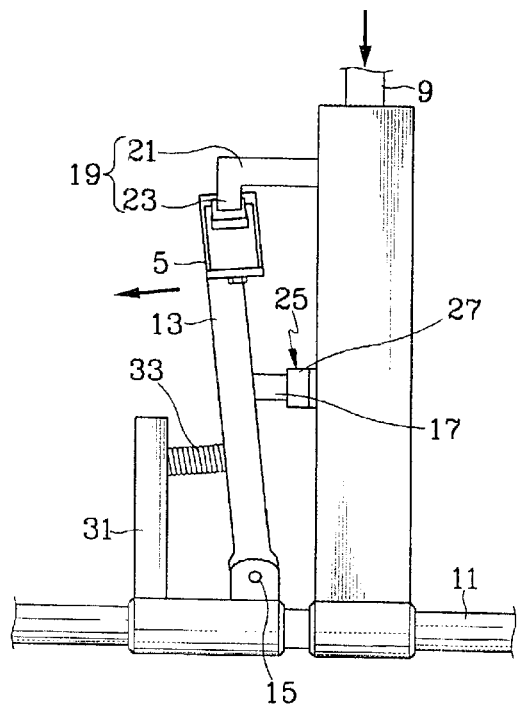
FIG. 6 is a side view of the shift switch control device of FIG. 5.
Figure 7:
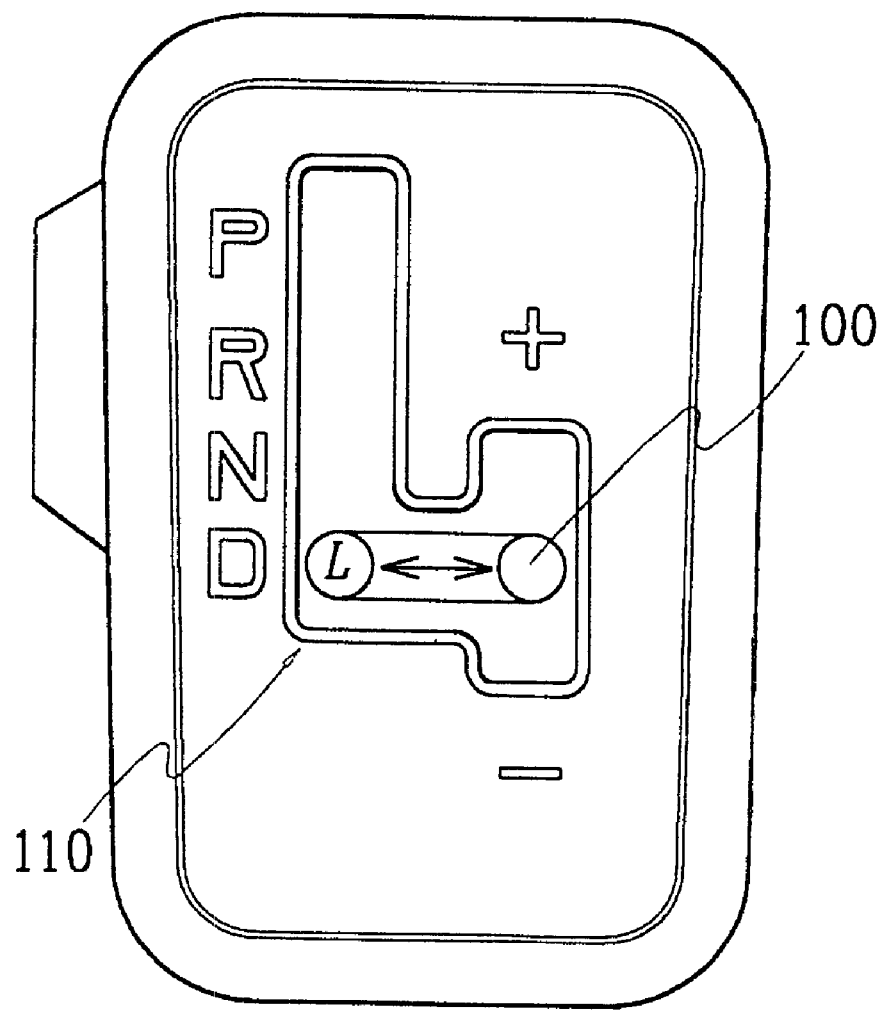
FIG. 7 is a view, showing the transmission pattern of a conventional selection lever unit of automatic transmissions capable of selectively performing an automatic transmission mode or a manual transmission mode as desired.
Figure 8:
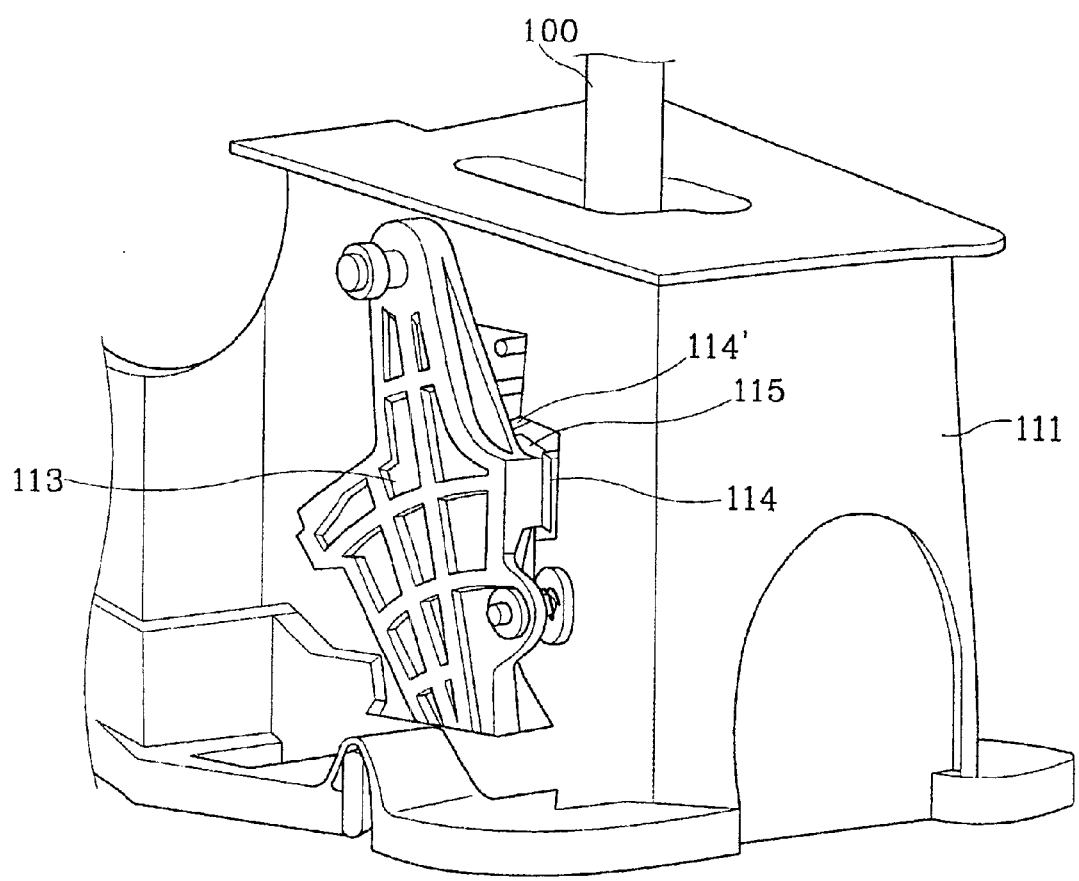
FIG. 8 is a perspective view, showing the construction of the conventional selection lever unit of automatic transmissions.
Figure 9:
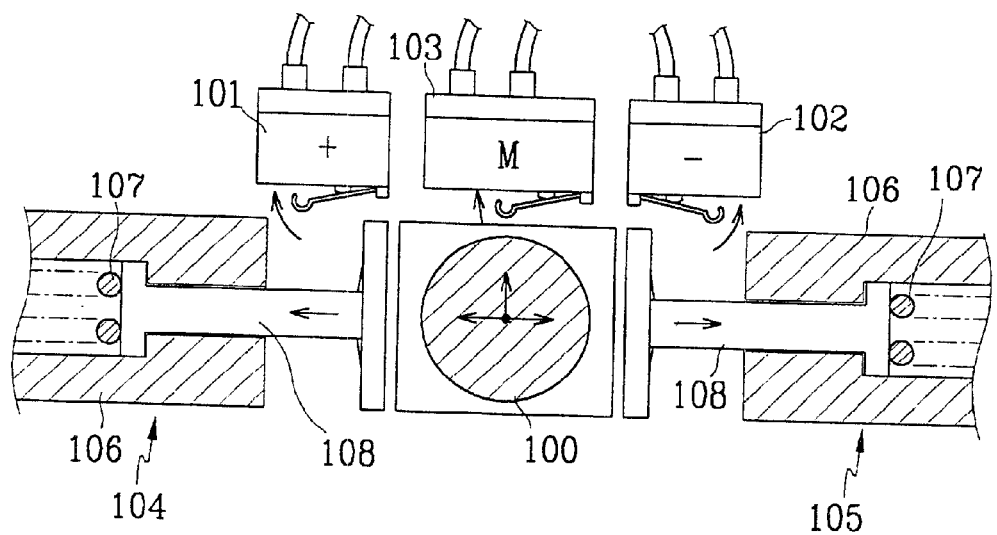
FIG. 9 is a plan sectional view, showing the construction of a conventional shift switch control device for selection lever units of automatic transmissions.

When the selection lever 9 is moved from the D-stage of the automatic transmission mode pattern 1 to the M-stage of the manual transmission mode pattern 3 as shown in FIGS. 5 and 6, the projection 17 of the rotary plate 13 is pushed outward by the inclined surface 27 of the projection guide plate 25 of the selection lever 9. Therefore, the rotary plate 13 is pushed outward, and so it is possible for the selection lever 9 to be moved from the D-stage of the automatic transmission mode pattern 1 to the M-stage of the manual transmission mode pattern 3 without allowing the manipulation lever 19 to be brought into undesired contact with the up-shift switch 5.

The selection lever 9 is thus completely moved to the M-stage of the manual transmission mode pattern 3, thereby selecting the manual transmission mode pattern 3. When the selection lever 9 in the above state is moved forward, the lever 9 turns on the actuation button of the up-shift switch 5, thus performing a desired up-shifting operation. On the other hand, when the selection lever 9 is moved backward, the lever 9 turns on the actuation button of the down-shift switch 7, thus performing a desired down-shifting operation.

In addition, the transmission mode shifting operation for shifting the mode from the M-stage to the D-stage is accomplished by reversely performing the above-mentioned transmission mode shifting operation for shifting the mode from the D-stage to the M-stage, and further explanation is thus not deemed necessary.

As described above, the present invention provides a shift switch control device for selection lever units of automatic transmissions capable of selectively performing an automatic transmission mode or a manual transmission mode as desired. In the shift switch control device, the actuated direction of the actuation buttons of the up- and down-shift switches is equal to that of the manipulation lever of the selection lever practically actuating the up and down-shift switches, thus accomplishing a desired operational reliability of the shift switch control device during a manual transmission mode. The shift switch control device of this invention is also reduced in the number of its parts, thus being preferably simplified in its construction. The shift switch control device is thus easily manufactured at a low production cost, and is easily installed within a limited area.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A shift switch control device for selection lever units of automatic transmissions, comprising:

a selection lever installed within a main frame of a chassis by a hinge shaft and used for selecting a desired range within a transmission pattern during an automatic transmission mode and performing an up- or down-shifting operation during a manual transmission mode, said transmission pattern having an automatic transmission mode pattern and a manual transmission mode pattern, said selection lever turning on or off up- and down-shift switches during the manual transmission mode, thus performing the up- or down-shifting operation;

a rotary plate mounted to said hinge shaft at one side of said selection lever, with the up- and down-shift switches provided at a top end of said rotary plate while being spaced apart from each other at a predetermined gap, and a projection provided at a central portion of the rotary plate while extending toward the selection lever;

a manipulation lever installed at a top portion of said selection lever such that the manipulation lever is positioned between said up- and down-shift switches at a M-stage of the manual transmission mode pattern, said manipulation lever being used for turning on or off said up- or down-shift switch;

a projection guide plate provided on said selection lever at a position corresponding to said projection of the rotary plate under the manipulation lever, with an inclined surface formed at one end of said projection guide plate to prevent said up-shift switch from coming into undesired contact with the manipulation lever when the selection lever is moved from a D-stage of the automatic transmission mode to the M-stage, thus allowing said projection to push the rotary plate outward so as to position the manipulation lever in the gap between the up- and down-shift switches; and rotary plate return means for giving an elastic returning force to said rotary plate, said rotary plate return means being mounted to said hinge shaft of the rotary plate at the outside of said rotary plate.

2. The shift switch control device according to claim 1, wherein said automatic transmission mode pattern comprising P, R, N and D-stages arranged in a line.

3. The shift switch control device according to claim 1, wherein said M-stage of manual transmission mode pattern being arranged in back of said automatic transmission mode pattern.

4. The shift switch control device according to claim 3, wherein said M-stage of the manual transmission mode pattern has a plus (+) stage for actuating said up-shift switch and a minus (−) stage for actuating said down-shift switch.

5. The shift switch control device according to claim 1, wherein said manipulation lever comprises:

a horizontal part having a predetermined length so as to be free from coming into undesired contact with said up-shift switch when the selection lever is moved from the D-stage to the M-stage; and a vertical part extending from a tip of said horizontal part downward to a predetermined length so as to selectively come into contact with the up- and down-shift switches, thus turning on or off said up- and down-shift switches.

6. The shift switch control device according to claim 1, wherein said projection guide plate comprises:

the inclined surface formed at the end of said projection guide plate, said inclined surface being operated in conjunction with the projection of the rotary plate when the selection lever is moved from the D-stage to the M-stage, thus preventing the up-shift switch from coming into undesired contact with the manipulation lever; and a flat guide surface linearly guiding a movement of said projection when the selection lever at the M-stage performs an up- or down-shifting operation.

7. The shift switch control device according to claim 1, wherein said rotary plate return means comprises:

a support bracket mounted to the hinge shaft of the rotary plate at the outside of said rotary plate; and a return spring positioned between said rotary plate and said support bracket.

* * * * *